(No Model.) 3 Sheets—Sheet 1.
S. T. ESKEW.
SEEDING MACHINE AND FERTILIZER DISTRIBUTER.
No. 307,279. Patented Oct. 28, 1884.
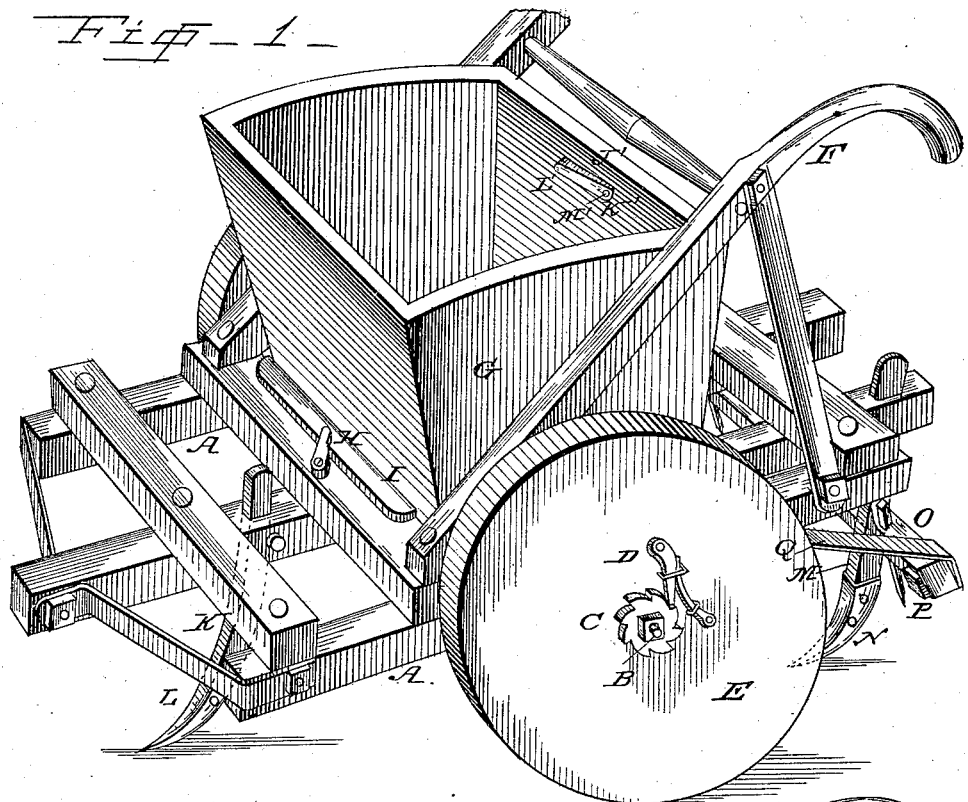
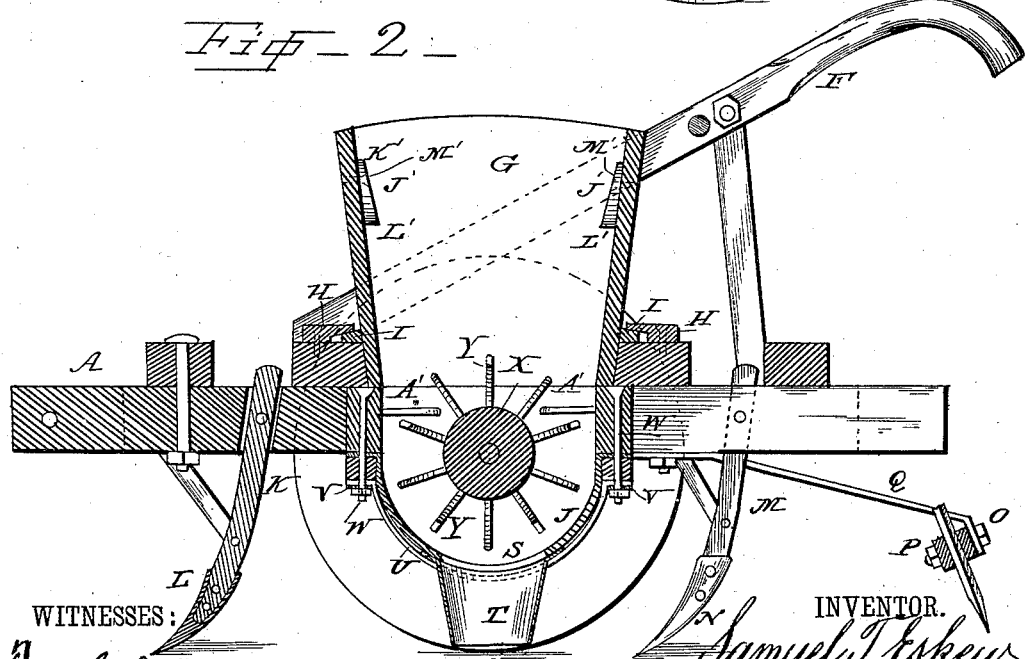
WITNESSES:
Fred. G. Dieterich
Wm. Fischer
INVENTOR.
Samuel T. Eskew
By Louis Bagger & Co.
ATTORNEYS.

(No Model.) 3 Sheets—Sheet 2.
S. T. ESKEW.
SEEDING MACHINE AND FERTILIZER DISTRIBUTER.
No. 307,279. Patented Oct. 28, 1884.
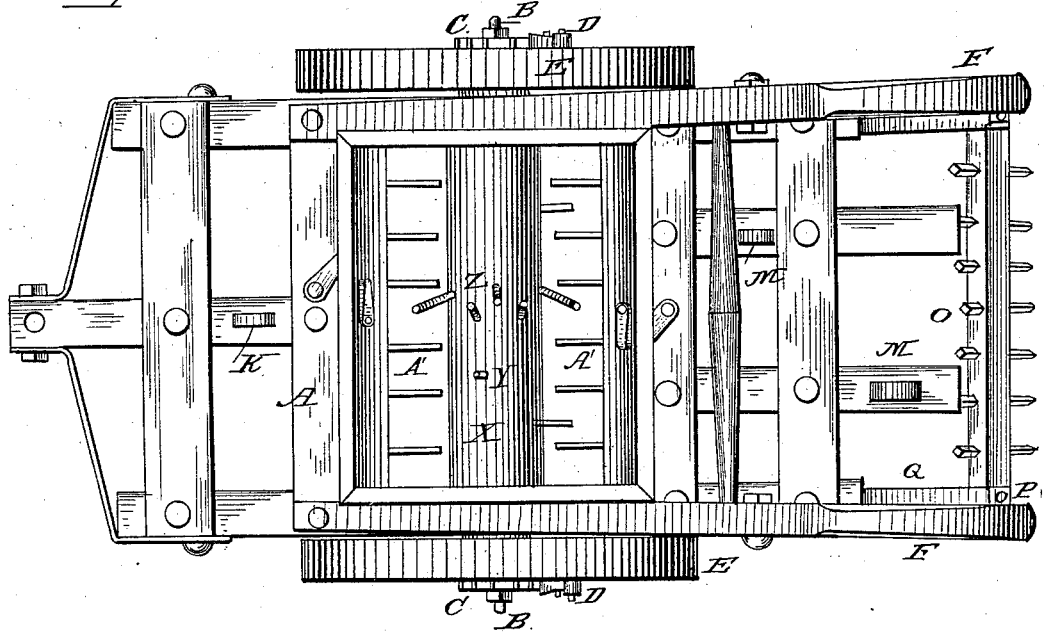
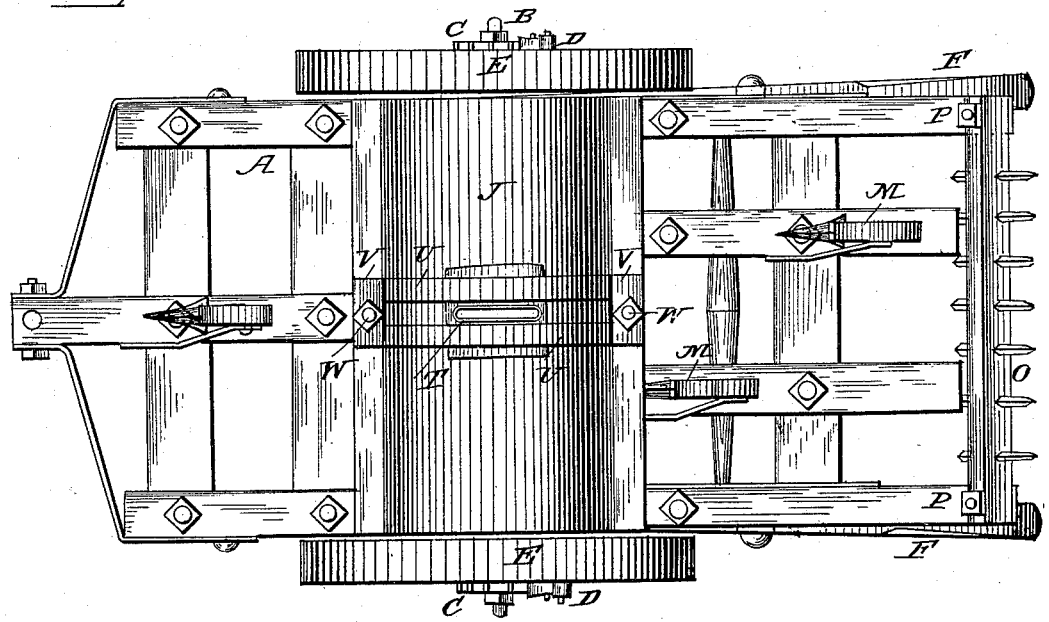

(No Model.) 3 Sheets—Sheet 3.

S. T. ESKEW.
SEEDING MACHINE AND FERTILIZER DISTRIBUTER.

No. 307,279. Patented Oct. 28, 1884.

WITNESSES:
Fred. G. Dieterich.
Wm. Fischer

INVENTOR.
Samuel T. Eskew
By Louis Bagger & Co.
ATTORNEYS.

UNITED STATES PATENT OFFICE.

SAMUEL T. ESKEW, OF CHERRY GROVE, ARKANSAS.

SEEDING-MACHINE AND FERTILIZER-DISTRIBUTER.

SPECIFICATION forming part of Letters Patent No. 307,279, dated October 28, 1884.

Application filed January 11, 1884. (No model.)

*To all whom it may concern:*

Be it known that I, SAMUEL T. ESKEW, a citizen of the United States, and a resident of Cherry Grove, in the county of Grant and State of Arkansas, have invented certain new and useful Improvements in Seeding-Machines and Fertilizer-Distributers; and I do hereby declare that the following is a full, clear, and exact description of the invention, which will enable others skilled in the art to which it appertains to make and use the same, reference being had to the accompanying drawings, which form a part of this specification, and in which—

Figure 5:
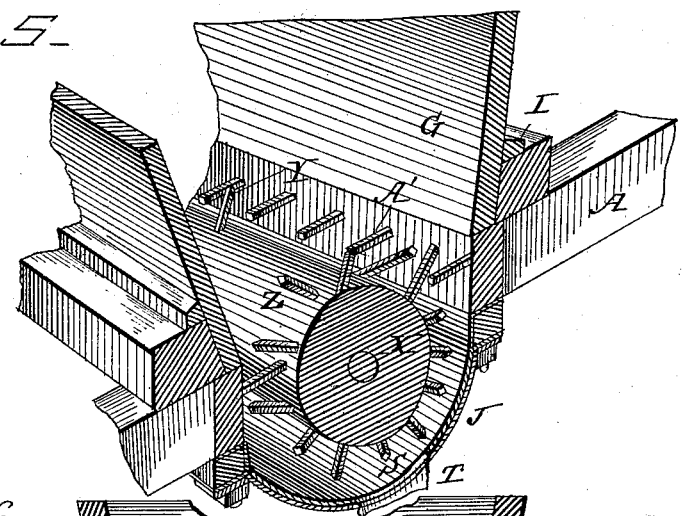
Figure 6:
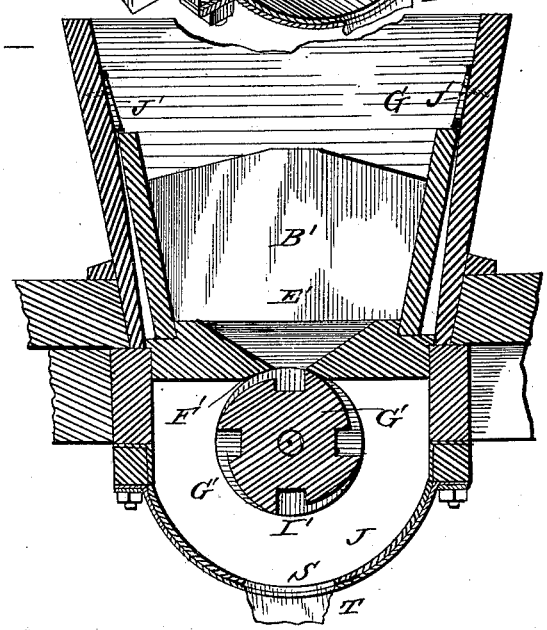
Figure 7:
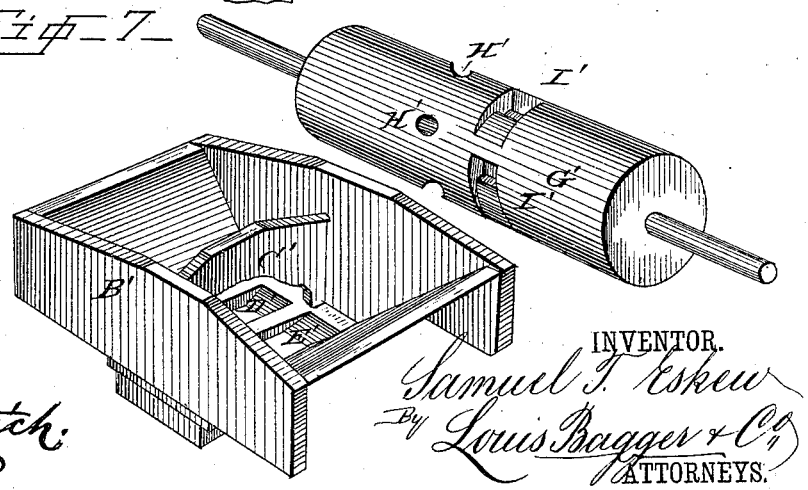

Figure 1 is a perspective view of my improved seeding-machine and fertilizer-distributer. Fig. 2 is a longitudinal vertical section of the same. Fig. 3 is a top view. Fig. 4 is a bottom view, and Figs. 5, 6, and 7 are detail views of the seed-box and the seed-cylinder when used as a cotton planter and as a corn or pea planter.

Similar letters of reference indicate corresponding parts in all the figures.

My invention has relation to seeding-machines and fertilizer-distributers; and it consists in the detailed construction and combination of parts of a machine which may be converted to sow cotton-seed, or corn, or peas in connection with a fertilizer, as hereinafter more fully described and claimed.

In the accompanying drawings, the letter A indicates a frame forming bearings in its side pieces for a shaft, B, having two ratchet-wheels, C, secured upon its outer ends, which ratchet-wheels are engaged by pawls D, secured upon the faces of the wheels E, which turn apon the axle inside the ratchet-wheels. The draft is applied to the front end of the frame, and two handles, F, are secured to the frame, extending upward and rearward, serving to guide the machine. A seed-box, G, is secured upon the top of the machine-frame by means of turn-buttons H upon the frame, engaging flanges I upon the lower forward and rear sides of the box, enabling the box to be removed, and a semi-cylindrical concave, J, is secured to the under side of the frame under the seed-box, which opens into the said concave, the axis of which falls in the axle upon which the drive-wheels turn. A cultivator-standard, K, is secured in the central line of the machine, at the forward end of the frame, and is provided with a shovel, L, which serves to open the furrow for the seed to be dropped, and two similar standards, M, having shovels N, are secured to the rear end of the frame to the rear of the seed-box, and serve to cover the planted seed. A rake-head or harrow, O, is secured, by means of nutted bolts P, to the rear ends of two rearwardly and downwardly inclined spring-bars, Q, secured to the under side of the rear portion of the frame, and where it is not desired to rake or harrow the ground after seeding, the rake or harrow may be removed and a covering-board put in its place. The concave has at its middle a transverse slot or aperture, S, through which the seed passes, and a flexible tube, T, is secured at the aperture by means of two curved strips, U, clamping the flanges of the tube on both sides of the aperture, and secured at their ends by means of two yokes, V, secured to the under side of the frame by means of nutted bolts W, the nuts upon which force the yoke down upon the ends of the curved strips, clamping them between the said yokes and the under side of the frame. A cylinder, X, of the same width as the concave and of the lower opening of the seed-box, is secured upon the axle, and is provided with a number of teeth, Y, arranged in alternating rows around the cylinder, and with two rows of teeth, Z, at its middle which converge, the ends of one row fitting into the spaces between the ends of the other row of teeth. The frame around the lower opening of the seed-box is provided at its forward and rear edges with two rows of teeth, A', which project between the teeth upon the cylinder as the latter rotates, assisting in stirring and separating the cotton-seed, for the seeding of which the cylinder is used, while the central inclined teeth serve to force the seed through the aperture in the concave. The toothed cylinder may also be used when sowing stable-manure or similar fertilizer, as well as fertilizer which is lumpy and requires breaking up, the teeth upon the cylinder and the frame comminuting the particles of the fertilizer and forcing them out through the aperture in the same manner as with the cotton-seed.

When the machine is to be used for planting corn, peas, or similar seed, dropping fertilizer at the same time, or planting two kinds of seed at once, a box, B', fitting inside the seed-box, is placed inside the same, and the said box has a longitudinal partition, C', and two perforations, D' and E', in the bottom—one at each side of the partition. The under side of the bottom of the auxiliary seed-box has a transverse cylindrical recess, F', and a cylinder, G', is secured upon the drive-axle in place of the spiked cylinder, and fits with a portion of its upper surface in the recess in the bottom of the box. This cylinder has two rows of cups, H' and I', at its middle, fitting or registering with the perforations in the bottom of the auxiliary seed-box, which cups alternate so that a seed-cup, H', will register with its perforation in the seed-box, a fertilizer-cup, I', with its perforation in the fertilizer-compartment in the seed-box, and so forth, the fertilizer being dropped alternately to the seed, falling either immediately under the seed or immediately over it.

The fertilizer-cups, which may also be used for seed, where two kinds of seed are sowed at the same time, are preferably round, and may have means for adjusting their capacity, while the seed-cups are rectangular, adjustable, if desired, and having an inclined side at the rear end or side of the cup, which allows the cup to cut off the flow of seed falling into the cup without breaking any grains which might be caught and cut between the edges of the cup and of the aperture in the seed-box if the edge of the cup were straight.

The auxiliary seed-box is held in place by means of two turn-buttons or pivoted wedges, J', consisting of a bar or short piece, wedge-shaped at one end, K', forming a handle, L', at the other end, and pivoted upon the inner forward and rear sides of the outer seed-box upon screws or bolts M'.

When the auxiliary seed-box is placed inside the outer seed-box, the turn-buttons are turned in a horizontal position, bearing against the upper edges of the auxiliary seed-box, while when turned up in a vertical position the wedge-shaped ends will allow the box to be lifted out, as will be plainly seen in Fig. 2.

The flexible tube at the seed-aperture in the concave may be dispensed with when planting seed sufficiently heavy not to be affected by the wind, while when planting light seed or fertilizer the tube will prevent it from being blown away.

I am aware that it is not broadly new to have a feeding-cylinder in a cotton-seeder or fertilizer-distibuter provided with projecting teeth or fingers, and I do not wish to claim such construction, broadly; but I am not aware that the middle of the feeding-cylinder has been provided with two rows of teeth having their ends inclined toward each other and projecting in the spaces between each other; and I am also aware that it is not broadly new to have a flexible tube attached to the aperture of the seed-box, and I do not wish to claim such a well-known device; but I am not aware that seed-tubes have been attached in the manner described and claimed; and I therefore claim—

The combination of the concave having the seed slot or aperture, the flexible seed-tube having flanges at its upper end, the curved clamping-strips, and the yokes and nutted bolts securing the ends of the clamping-strips, as and for the purpose shown and set forth.

In testimony that I claim the foregoing as my own I have hereunto affixed my signature in presence of two witnesses.

SAMUEL T. ESKEW.

Witnesses:
A. B. CHILDERS,
R. M. RODGERS.